(12) United States Patent
Allen, II et al.

(10) Patent No.: US 8,512,555 B1
(45) Date of Patent: Aug. 20, 2013

(54) FILTER ASSEMBLY, SYSTEM AND METHOD

(75) Inventors: Vaikko P. Allen, II, Santa Monica, CA (US); Scott A. de Ridder, Portland, OR (US); Christopher S. Hersey, South Portland, ME (US); Daniel P. Cobb, Portland, ME (US); Greg Kowalsky, Portland, OR (US); Alan K. Stratton, Milford, NH (US)

(73) Assignee: Contech Engineered Solutions LLC, Wester Chester, OH (US)

( * ) Notice: Subject to any disclaimer, the term of this patent is extended or adjusted under 35 U.S.C. 154(b) by 592 days.

(21) Appl. No.: 12/700,224

(22) Filed: Feb. 4, 2010

Related U.S. Application Data

(62) Division of application No. 11/843,148, filed on Aug. 22, 2007, now abandoned.

(60) Provisional application No. 60/839,623, filed on Aug. 23, 2006.

(51) Int. Cl.
*B01D 35/30* (2006.01)
*B01D 24/10* (2006.01)

(52) U.S. Cl.
USPC ....... 210/170.03; 210/439; 210/440; 210/292

(58) Field of Classification Search
None
See application file for complete search history.

(56) References Cited

U.S. PATENT DOCUMENTS

| | | | |
|---|---|---|---|
| 3,298,523 A | 1/1967 | Johnson | |
| 3,534,855 A | 10/1970 | Guillerd et al. | |
| 3,623,978 A | 11/1971 | Boze et al. | |
| 3,724,665 A | 4/1973 | Hall | |
| 3,820,658 A | 6/1974 | Cruze, Jr. | |
| 3,948,773 A | 4/1976 | Tucker | |
| 3,994,810 A | 11/1976 | Schaeffer | |
| 4,036,757 A | 7/1977 | Peasley | |
| 4,297,209 A * | 10/1981 | DeVisser et al. | ............. 210/107 |
| 4,405,466 A | 9/1983 | Giannelli et al. | |
| 4,477,343 A | 10/1984 | Tucker | |
| 4,537,687 A | 8/1985 | Piper | |
| 4,561,979 A | 12/1985 | Harms et al. | |
| 4,592,848 A | 6/1986 | Pabst | |

(Continued)

FOREIGN PATENT DOCUMENTS

| | | |
|---|---|---|
| GB | 1388256 | 3/1975 |

OTHER PUBLICATIONS

Hydro International Stormwater, www.hydro-international.biz/us/stormwater)us/upflo.php, Jul. 21, 2006, 2 pages.

(Continued)

*Primary Examiner* — Katherine Zalasky

(74) *Attorney, Agent, or Firm* — Thompson Hine LLP

(57) ABSTRACT

A stormwater filter assembly includes a hood and an outlet tube within the hood for draining filtered stormwater. The outlet tube has a solid wall along at least a portion of its height, and an inlet above the solid wall. A second tube is disposed about the outlet tube defining a flow space therebetween for receiving filtered stormwater. The second tube includes a wall that is perforated along at least a portion of its height that overlaps with the solid wall of the outlet tube such that filtered stormwater that enters the flow space must move upward to enter the outlet tube. A filter media is disposed between the hood and the second tube through which stormwater travels during a filtering operation.

9 Claims, 13 Drawing Sheets

(56) References Cited

U.S. PATENT DOCUMENTS

| | | |
|---|---|---|
| 4,642,188 A | 2/1987 | DeVisser et al. |
| 4,643,836 A | 2/1987 | Schmid |
| 4,678,564 A | 7/1987 | Moorehead et al. |
| 4,818,420 A | 4/1989 | Mims |
| 5,000,860 A * | 3/1991 | Drewry .................... 210/721 |
| 5,017,241 A | 5/1991 | Ryan |
| 5,114,596 A | 5/1992 | Laterra |
| 5,151,175 A | 9/1992 | Royal |
| 5,214,020 A | 5/1993 | Shimoda |
| 5,288,399 A | 2/1994 | Schulz |
| 5,322,629 A | 6/1994 | Stewart |
| 5,464,543 A | 11/1995 | Moore |
| 5,484,536 A | 1/1996 | Yamaguchi et al. |
| 5,624,576 A | 4/1997 | Lenhart et al. |
| 5,707,527 A | 1/1998 | Knutson et al. |
| 5,720,875 A | 2/1998 | Stegall, Sr. et al. |
| 5,746,911 A | 5/1998 | Pank |
| 5,759,412 A | 6/1998 | McDouglad |
| 5,792,373 A | 8/1998 | Bennick et al. |
| 6,027,639 A | 2/2000 | Lenhart, Jr. et al. |
| 6,110,389 A | 8/2000 | Hotowitz |
| 6,126,816 A * | 10/2000 | Ruiz, Jr. .................... 210/95 |
| 6,132,626 A | 10/2000 | Hart |
| 6,171,507 B1 | 1/2001 | Roy et al. |
| 6,197,192 B1 | 3/2001 | Smith-Hadon et al. |
| 6,264,835 B1 | 7/2001 | Pank |
| 6,294,098 B1 | 9/2001 | Bergmann |
| 6,368,513 B1 | 4/2002 | Christophe et al. |
| 6,428,690 B1 | 8/2002 | Tse |
| 6,576,146 B2 | 6/2003 | Fry et al. |
| 6,596,158 B1 | 7/2003 | Cowan |
| 6,649,048 B2 | 11/2003 | de Ridder et al. |
| 6,869,528 B2 | 3/2005 | Pank |
| 6,921,481 B2 | 7/2005 | Jessop et al. |
| 7,000,782 B2 | 2/2006 | Walton et al. |
| 7,032,760 B2 | 4/2006 | Walton et al. |
| 7,182,856 B2 | 2/2007 | Pank |
| 7,214,311 B2 | 5/2007 | Aberle et al. |
| 2002/0117435 A1 | 8/2002 | Pank |
| 2003/0034286 A1 | 2/2003 | Butler |
| 2003/0127377 A1 | 7/2003 | Pank |
| 2003/0196950 A1 | 10/2003 | Kraft |
| 2005/0178719 A1 | 8/2005 | Pank |
| 2007/0023352 A1 | 2/2007 | Pank et al. |
| 2008/0217227 A1 | 9/2008 | Pank |
| 2008/0217238 A1 | 9/2008 | Pank |
| 2008/0217257 A1 | 9/2008 | Pank |

OTHER PUBLICATIONS

Setting the Standard Technology Driving Design, www.hydrointernational.biz, 2 pages, 2006.

The new direction in stormwater filtration::UP, www.hydrointernational.biz, 5 pages, 2006.

Baysaver Technologies, Inc.; BayFilter™ System; *Technical and Design Manual*; Version 1.1; Nov. 2006.

Baysaver Technologies, Inc; *Sand Filter Performance in a Cartridge Based Design—Introducing the all-new BayFilter™ with a flow capacity of 30 GMP*; Jul. 2006.

Prosecution History of U.S.; US 2007/0023352; Feb. 1, 2007.

* cited by examiner

FILTER ASSEMBLY, SYSTEM AND METHOD

CROSS-REFERENCE TO RELATED APPLICATIONS

This application claims priority to U.S. Provisional Application No. 60/839,623, filed Aug. 23, 2006, the details of which are hereby incorporated by reference as if fully set forth herein.

TECHNICAL FIELD

The present application relates generally to a filter apparatus and, in particular, a modular filter assembly having backflow capability.

BACKGROUND

Stormwater is rainwater plus any particulate debris and dissolved materials that the rainwater carries along with it. In urban areas, rain that falls on the roofs of buildings, collects on paved areas like driveways, roads, runways and sidewalks is typically diverted through a system of pipes that is separate from the sewerage system. Unlike sewage, stormwater historically has not been treated, but flowed directly from streets and gutters into natural bodies of water, e.g., rivers, lakes and the ocean.

Stormwater can therefore be a form of diffuse or non-point source pollution. It can entrain pollutants, such as garbage, sediment, organic matter, heavy metals, and organic toxins, and transport them into receiving natural bodies of water. As a consequence, natural bodies of water that receive stormwater may also receive pollutants capable of irreparable environmental harm.

The amount of stormwater pollution entering into such receiving bodies of water is related to the degree of urbanization in the surrounding area and the nature of the surrounding activities. Urbanization results in the covering of land with low/no-permeability structures, such as roadways, parking lots, and rooftops, which both generate large volumes of stormwater and accumulate pollutants. Since these types of surfaces do not allow rainfall to infiltrate, they allow the accumulated pollutants to be carried into stormwater drainage systems.

In an effort to address the environmental problems posed by polluted stormwater, traps and filters for stormwater have been developed. For example, U.S. Pat. No. 5,322,629 describes a method and apparatus for treatment of stormwater by vertical filtration through a bed of high-quality leaf compost material that removes pollutants prior to discharge into a receiving water body.

A granular form of compost that improves the overall performance of such filtration systems was described in U.S. Pat. No. 5,624,576. The permeability of a filter containing such granular compost is increased, and can be maintained for an extended period of time.

The improved filter apparatus described in U.S. Pat. No. 6,027,639 features a siphon. The filter apparatus of the '639 patent utilized a sealed upper housing that included a check valve for air evacuation within the housing. An induced siphon effect pulled stormwater through the filter until air was pulled through an air inlet along the lower perimeter of the housing, disrupting the siphon. It was intended that the air stream that resulted from such a siphon-breaking event would produce turbulence and thereby clean the filter.

SUMMARY

In an aspect, a stormwater filter assembly includes a hood and an outlet tube within the hood for draining filtered stormwater. The outlet tube has a solid wall along at least a portion of its height, and an inlet above the solid wall. A second tube is disposed about the outlet tube defining a flow space therebetween for receiving filtered stormwater. The second tube includes a wall that is perforated along at least a portion of its height that overlaps with the solid wall of the outlet tube such that filtered stormwater that enters the flow space must move upward to enter the outlet tube. A filter media is disposed between the hood and the second tube through which stormwater travels during a filtering operation.

In another aspect, a filter assembly includes a hood and a central outlet tube within the hood for draining filtered stormwater. The central outlet tube has a solid wall along at least a portion of its height, and an inlet above the solid wall portion. A filter media is disposed between the hood and the central outlet tube through which stormwater travels to reach the central outlet tube during a filtering operation. A filtered fluid reservoir is located within the hood and above the filter media. The central outlet tube extends upward above the filter media and the inlet is above the filter media such that some filtered stormwater must collect above the filter media prior to filtered stormwater beginning to flow down the central outlet tube.

In another aspect, a system for filtering liquid includes a tank for receiving the liquid fluid to be filtered. A filter cartridge is within the tank and has a hood with a top and a downwardly extending sidewall. A filter is within the filter cartridge and through which liquid passes during filtering. The filter has a top side spaced below the top of the hood thereby forming a space which may receive liquid that passes through the filter, and an outlet conduit for discharging liquid from the space. The filter includes a filter medium for receiving liquid to be filtered and a filter material bed. The filter medium is arranged such that liquid passing through the filter cartridge passes through the filter medium before entering the filter material bed. An outlet conduit is provided for discharging liquid from the space.

This aspect may include one or more of the following features. The outlet conduit includes a pipe extending downward from the space through the filter material. The filter medium includes an outer screen having overlapping ends. The filter material bed includes a bed of sand. The filter material bed is annular and has a radially inner side positioned adjacent an outer wall of the outlet conduit. The filter material bed is annular and has a radially inner side that is spaced away from the outlet conduit. A flow restrictor limits liquid flow through the outlet conduit to cause the outlet conduit to fill with liquid. The filter cartridge includes a one-way air valve to release air from the hood as liquid level inside the tank rises, enabling a siphon effect to be established within the filter cartridge.

The details of one or more embodiments are set forth in the accompanying drawings and the description below. Other features, objects, and advantages will be apparent from the description and drawings, and from the claims.

DETAILED DESCRIPTION

Figure 1:
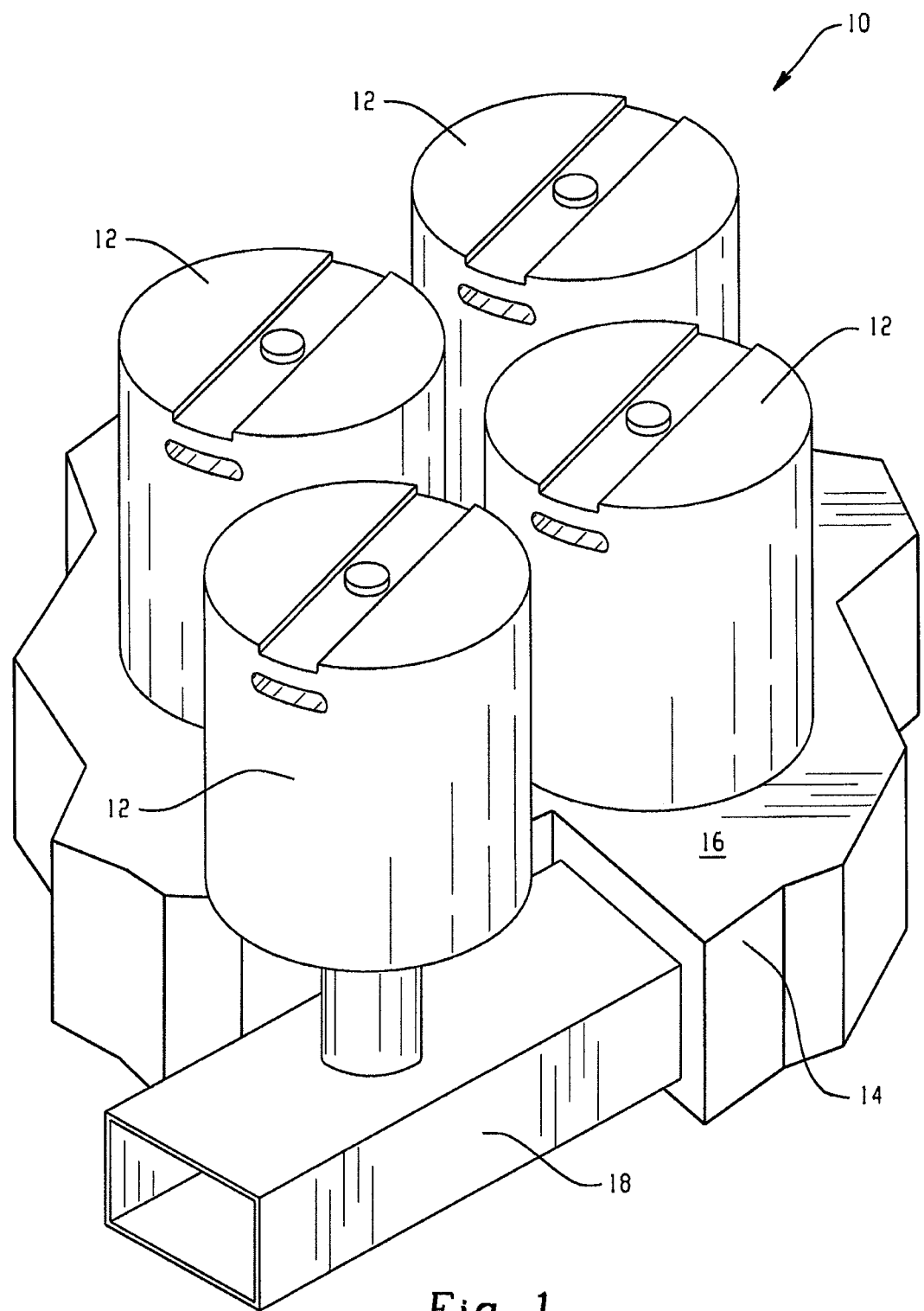
FIG. 1 is a perspective view of an embodiment of a manifold of filter assemblies within a containment structure.

Referring to FIG. 1, a manifold 10 of filter assemblies 12 is shown. The filter assemblies 12 are typically housed in a containment structure 14 (e.g., formed of concrete, metal or other suitable material) that is generally adapted to receive stormwater runoff from a stormwater drainage conduit, a parking lot, a street, or other impermeable and/or semi-impermeable surface. The containment structure 14 may include a forebay that includes a storm water settling basin (not shown) that facilitates settling of particulates and debris from the stormwater. Advantageously, as will be described below, the containment structure 14 may not require a settling basin due, at least in part, to the elevated position of the filter assemblies 12 from the floor 16 of the containment structure. The elimination of the settling basin can allow for placement of additional filter assemblies 12 within a containment structure 14 of the same size footprint by expanding the water treatment zone. In some embodiments, the filter assemblies 12 are not elevated.

A given containment structure 14 may contain a single filter assembly 12, but more typically contains two or more filter assemblies. The drainage space of each filter assembly 12 is in fluid communication with a drain manifold 18 that is generally embedded in the containment structure 14, as shown in FIG. 1 (in some embodiments, the drain manifold or flow kit may not be embedded in concrete of the containment structure). The drain manifold 18 of each filter assembly 12 may lead to a trough (e.g., a covered or uncovered trough), or an outlet compartment structure may release water into down stream piping for delivery to a receiving water body, and/or for diversion to an additional treatment plant for further purification, as examples.

Figure 2:
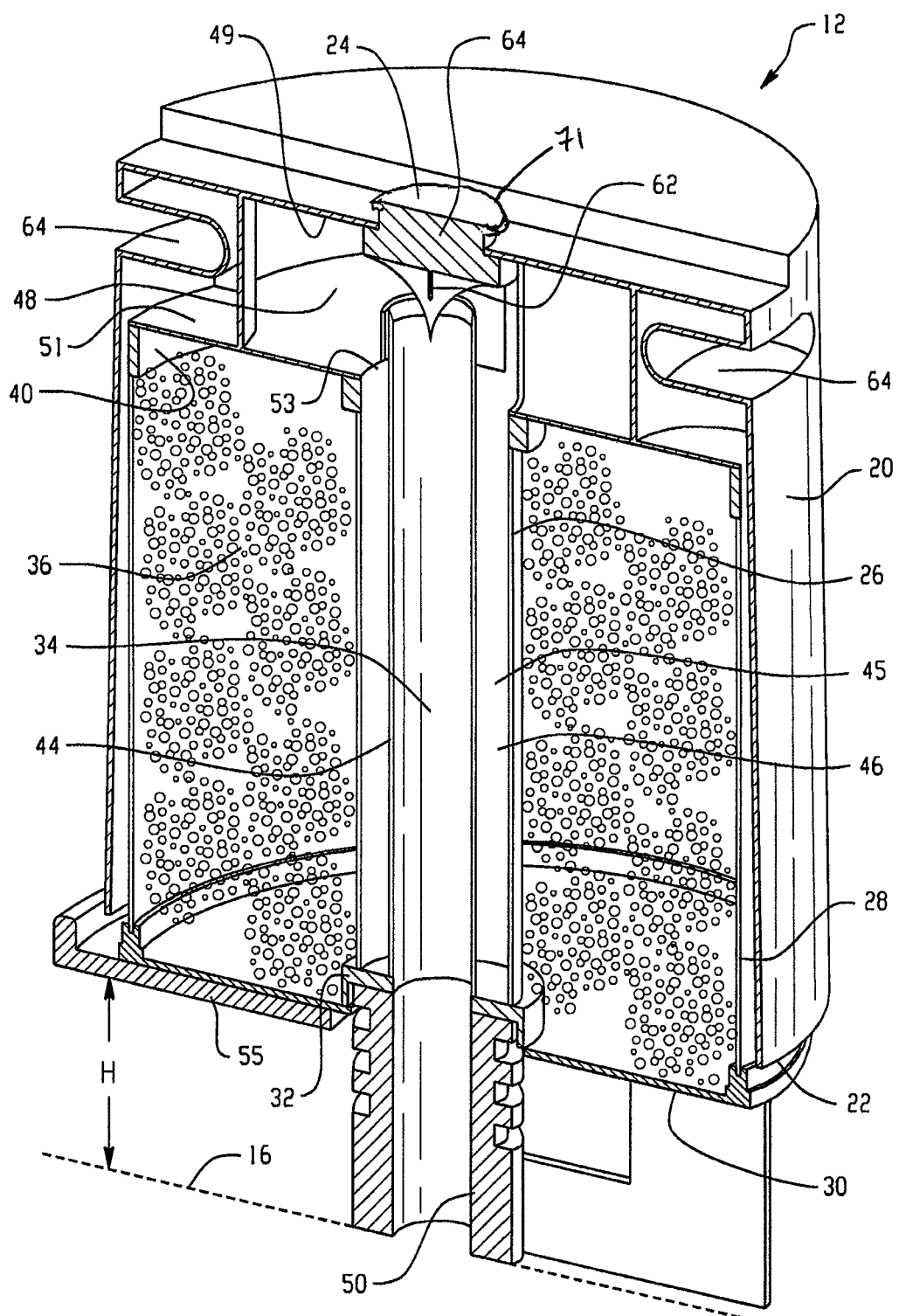
FIG. 2 is a perspective, section view of an embodiment of a filter assembly for use with the manifold of FIG. 1.

The filter assembly 12 serves to channel stormwater through a filter medium, and facilitate efficient filtration of the stormwater. Referring to FIG. 2, filter assembly 12 is substantially enclosed by a hood 20 that optionally may include a plurality of voids (not shown) to enhance the regulated surface cleaning of the filter medium. The voids may be arranged in a horizontally-aligned array within the material of the hood, for example near a lower edge 22 of hood 20.

Hood 20 can be attached to the filter assembly 12 via a cap 24, which may engage an upward-extending end of an inner perforated tube 26, that extends through the center of hood 20 or the hood may be attached to the filter assembly by other means. The connection between the cap 24 and the hood 20 may be sealed, for example, through the use of a hood gasket of an appropriate sealing material, such as neoprene rubber. The cap 24 may further include an air valve (e.g., a one way valve) for allowing air to escape from the filter assembly 12 during a storm event. Hood 20 may be attached to an outer support screen 28 using one or more mechanical fasteners. Such fasteners may be seated against the hood 20 so that an airtight seal is developed. Alternatively, the hood 20 is secured satisfactorily by the cap 24, and additional perforations of the hood are minimized or eliminated. Other connections may be used to connect the hood 20 such as textured surface, mechanical locks, etc.

The components of the filter assembly 12 are supported by a base 30 (a circular base in the case of the illustrated filter assembly) of water-impermeable material, preferably plastic. This base 30 is seated over a connector 32 that serves as the connection point between the filter assembly 12 and the drain manifold 18. The connector 32 is in fluid communication with the inner drainage space 34 that is in turn in fluid communication with a filter medium 36. The filter medium 36 is disposed in an annular space surrounding the inner drainage space 34 and is bounded by the outer screen 28 that is connected to the base 30 and supported at its upper extremity by an outer screen support ring 40 and the perforated tube 26 or screen that surrounds (or is coaxially aligned with) a central, solid-walled drain tube 44. A volume 45 defined between the drain tube 44 and the perforated tube 26 forms a fluid path 46 along which fluid may travel to and from a filtered water reservoir 48 located above and separated from the filter medium 36. As can be seen, the filtered water reservoir 48 is formed between the filter medium 36 and an upper wall 49 of the hood 20. A barrier wall 51 is located above the filter medium 36, preventing passage of stormwater upwardly thereby except through an opening 53 located above the perforated tube 26.

The drain manifold 18 incorporated in the cartridge containment structure 14 connects vertically to the base of the inner drainage space 34 via the connector 32, which allows the flow of treated stormwater out of the filter assembly 12. Inner drainage space 34 is defined by the drain tube 44 that is connected to a raised support conduit 50.

Connector 32 serves as the connection point between the filter assembly 12 and the raised support conduit 50. Raised support conduit 50 separates the filter assembly 12 including filter medium 36 from the floor 16 (represented by dotted line 16) of the containment structure 14. In some embodiments, the raised support conduit 50 locates the filter assembly 12 at an elevation H of about one inch or more, such as about two inches or more, such as about three inches or more, such as about four inches or more, such as about five inches or more, such as about six inches or more, such as between about one inch and about 10 inches, such as about six inches from the floor 16. The space between the floor and the filter assemblies 12 can provide a volume in which sediment and debris can be trapped beneath the filter assemblies 12, which can eliminate need for a settling basin as indicated above. Elimination of the settling basin can allow for placement of additional filter assemblies 12 within a containment structure 14 of a given footprint, which can increase the structure's total stormwater treatment capacity.

The raised support conduit 50 may be used with one or more or even all the filter assemblies 12 within the containment structure 14. In some embodiments, all of the filter assemblies 12 within the containment structure 14 are spaced from the floor 16 a distance H. In other embodiments, some or all filter assemblies 12 may be spaced from the floor different distances. In certain embodiments, only some or one filter assembly 12 may be spaced from the floor 12 while another or other filter assemblies are located flush with the floor.

Figure 3:
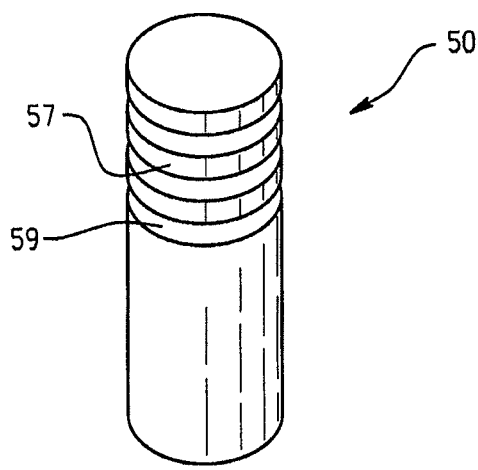
FIG. 3 is a perspective view of an embodiment of a raised support conduit for supporting the filter assembly of FIG. 2 at an elevation above a floor of the containment structure of FIG. 1.
Figure 4:
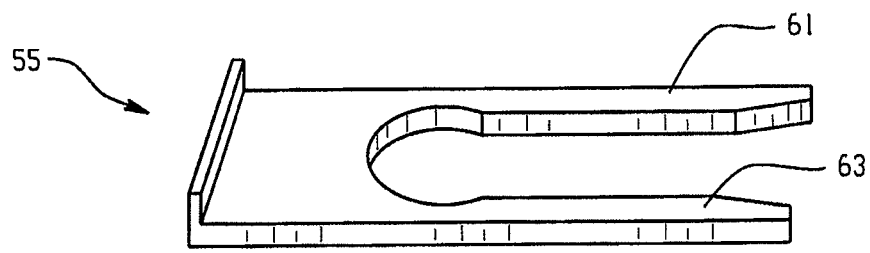
FIG. 4 is a perspective, top view of an embodiment of a lock mechanism for use in releasably locking the filter assembly of FIG. 2 to the raised support conduit of FIG. 3.
Figure 5:
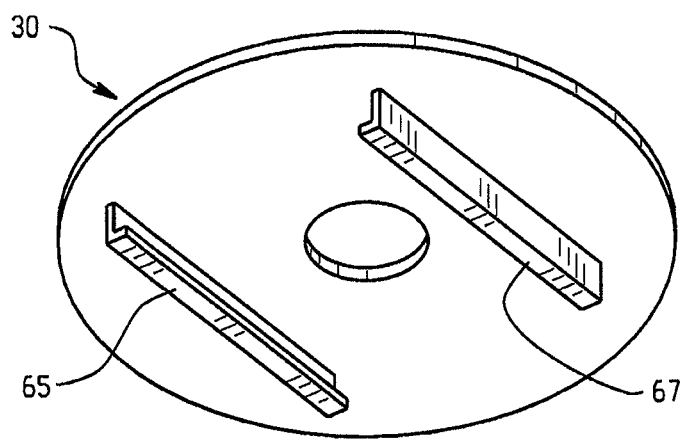
FIG. 5 is a perspective bottom view of an embodiment of a base of the filter assembly of FIG. 2 showing brackets for receiving the lock mechanism of FIG. 4.

A lock mechanism 55 is used to releasably attach the filter assembly 12 to the raised support conduit 50 and inhibits movement of the filter assembly both axially and radially relative to the raised support conduit. Referring to FIGS. 3-5, the raised support conduit 50 includes a series of ribs 57 and grooves 59 (FIG. 3). The grooves 59 are sized to receive tines 61 and 63 of the lock mechanism 55 between adjacent ribs 57. Referring to FIG. 5, the base 30 of the filter assembly 12 includes a pair of brackets 65 and 67 that are sized and arranged to form a slot into which the lock mechanism 55 can be inserted to lock or anchor the filter assembly 12 to the raised support conduit 50 as shown by FIG. 2.

Figure 6:
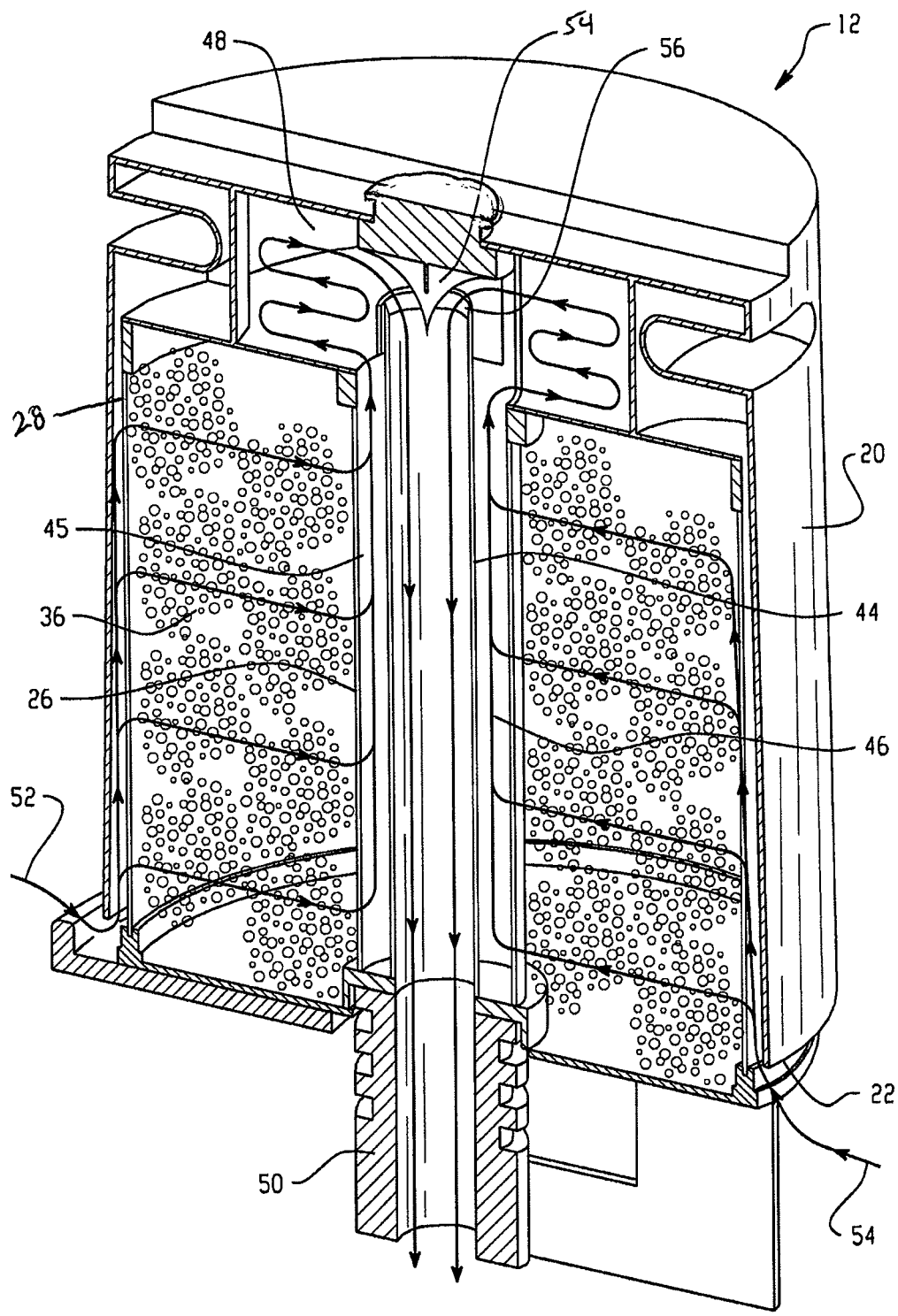
FIG. 6 is a schematic view of stormwater flow through the filter assembly of FIG. 2.
Figure 7:
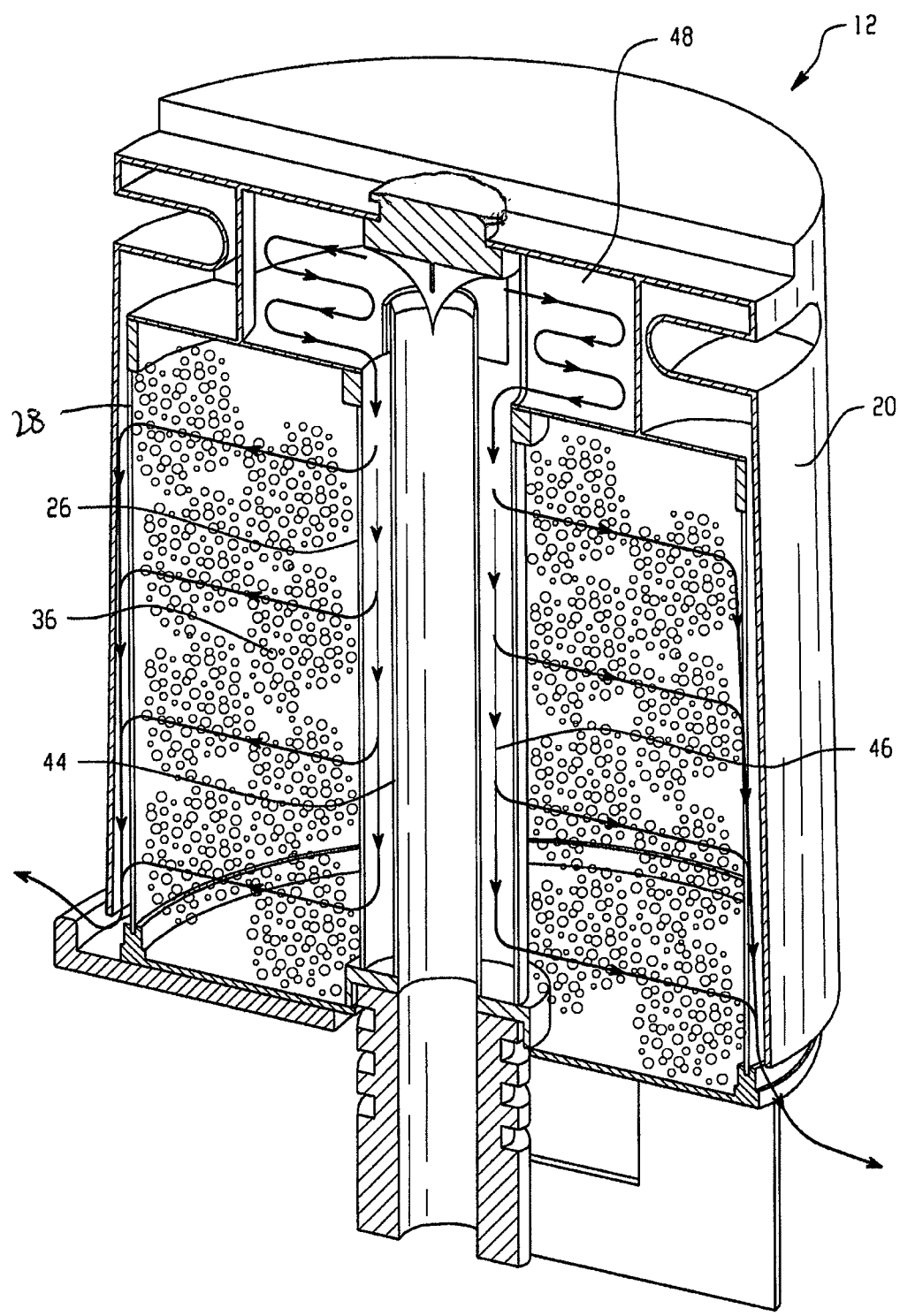
FIG. 7 is a schematic view of stormwater back flow through the filter assembly of FIG. 2.

FIGS. 6 and 7 show, schematically, stormwater flow (represented by the arrows) through the filter assembly 12 during a stormwater filter and drain process. Referring first to FIG. 6, the filter assembly 12 generally relies on hydraulic pressure to force water through the filter medium 36 and the filter assembly is therefore at least partially submerged in stormwater during normal operation. As shown by the arrows 52 and 54, stormwater enters the filter assembly 12 from beneath hood 20, infiltrates radially inward through the outer screen 28 and filter medium 36, and travels into the volume 45 located between the drain tube 44 and the perforated tube 26. Filtration occurs as the water is strained through, and comes into contact with, the filter medium 36 and thus stormwater traveling along path 46 from the filter medium within the volume 45 is filtered. Once in the volume 45, the filtered stormwater travels vertically along the path 46 and into the reservoir 48 located above the filter medium 36.

Filtered stormwater can fill the reservoir 48 and overflow into the drain tube 44 thereby creating a siphon effect and pulling the filtered stormwater from the reservoir down the drain tube and out of the filter assembly 12. Once established, the siphon effect continues to draw stormwater through the filter assembly 12 until the water surface elevation outside the hood 20 drops below the level of the lower edge 22 of the hood, causing outside air to be drawn beneath the hood to disrupt or "break" the siphon. In some embodiments, an air valve may be included to aid in removing air from the filter assembly 12 as it fills with stormwater.

Once the siphon is broken, referring now to FIG. 7, filtered stormwater that has accumulated in the reservoir 48 begins a journey back through the filter assembly 12. In particular, the filtered stormwater travels from the reservoir 48, vertically down the path 46 between the drain tube 44 and the perforated tube 26, radially outwardly through the filter media 36 and beneath the hood 20. This back flush of filtered stormwater can serve to loosen and remove particles trapped in the filter media 36, thereby increasing the longevity of the filter media.

In order to encourage filling of the drain tube 44 to produce a siphon, a flow limiter may be placed at the lower end of the drain tube, in the raised support conduit 50 or elsewhere in the downstream flow path. The flow limiter could be a restriction (i.e., decreased flow area) or could be a valve. The flow limiter could also be defined by the size of the drain manifold 18 as compared to expected flow through the multiple filter assemblies connected to it.

In FIGS. 6 and 7, the inlet of the drain tube 44 is located in the reservoir 48. In some embodiments, a reservoir volume may extend up into the cap 24 and the inlet of the drain tube may be located in this reservoir volume. In this embodiment, the drain tube 44 terminates at a higher elevation than shown in FIGS. 6 and 7 and may actually be located above the upper wall of the reservoir 48. This increased elevation of the inlet of the drain tube 44 can facilitate evacuation of air from the filter assembly.

Figure 8:
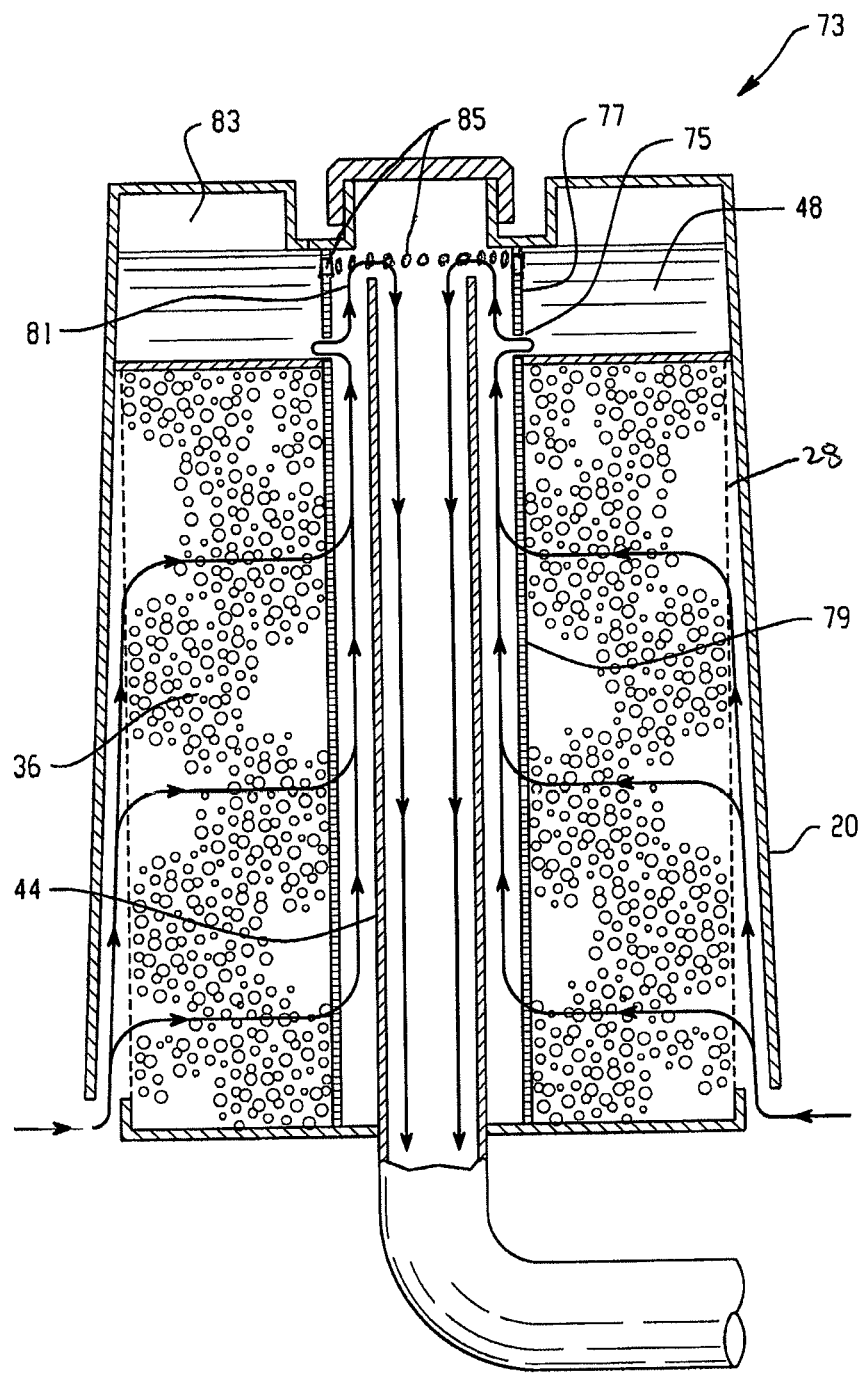
FIG. 8 is a schematic, section view of an alternative embodiment of a filter assembly.

Referring to FIG. 8, in an alternative filter assembly embodiment 73, filtered stormwater enters the reservoir 48 through an opening 75 through a wall 77 of perforated tube 79. Once the filtered stormwater reaches a maximum fluid level in the reservoir 48 with an air trap 83 thereabove, filtered stormwater flows along path 81 adjacent the reservoir 48 and into the drain tube 44 creating the siphon effect. Openings 85 are provided to allow pressure to equalize between the fluid level in the center tube 44 and reservoir 48.

The size of the reservoir 48 may be selected to provide a back flush of stormwater of a preselected volume. In some embodiments, it may be desirable to provide a back flush of filtered stormwater that is one or more, such as two times an "open space" volume of the filter media 36. For example, assuming 50 percent of the volume occupied by the filter media is open space or unfilled, the volume of the reservoir 48 may be selected to match that of the open space volume of the filter media 36, which can be determined by multiplying the total volume of the filter media, in this example, by 50 percent. By matching the volume of the reservoir 48 and the open space volume of the filter media 36, the filter media will be back flushed approximately two times once the siphon is broken (once by stormwater already located in the open space volume of the filter media 36 and once by the stormwater located in the reservoir 48). In some embodiments, it may be desirable to provide more than (or less than) two times back flush of stormwater through the filter media 36, for example, by multiplying the total volume of the filter media by some percentage that is greater than (or less than) 50 percent.

Referring briefly to FIG. 1, it should be noted that during a particular storm event, multiple back flushes of the filter assemblies 12 within a containment structure 14 may occur. Multiple back flushes may occur, for example, if the total outlet flow from the filter assemblies 12 is greater than the inlet flow of the stormwater into the containment structure 14. In some instances, however, there may be only a single back flush of filtered water. Flushing particles from the media, mesh, center tube and outer screen while the particles are wet can allow for improved clearing of the particles therefrom.

The filter medium or media are selected to efficiently remove contaminants by physical filtration. Additionally, the filter medium or media may be selected to remove contaminants through mechanical action, chemical action, biological action, or by any suitable combination thereof. In one aspect, a screen such as outer screen 28 is a satisfactory physical filter without the presence of additional filter media. The filter assembly may be capable of high throughput, rapidly screening debris from large volumes of stormwater. Alternatively, the filter includes outer screen 28 and one or more types of filter medium that is selected for finer filtration, for appropriate chemical reactivity, or appropriate biological activity. Mixtures of different media types are optionally used to provide advantageous combinations of filtering ability.

The filter medium may be selected to remove heavy metals, oils and greases, organic toxins, and other contaminants that stormwater typically accumulates when flowing over non permeable or non porous areas in residential or industrial communities before entry into a stormwater drainage system. Alternatively, or in addition, the filter medium is selected to remove total or dissolved phosphorous or nitrogen from stormwater. Selected media include, without limitation, organic compost, vermiculite, activated carbon, peat, zeolite, perlite, diatomaceous earth, clay minerals, commercial ion exchange resins, catalyst-infused resins, silica sand, iron-infused media, or mixtures of these. The filter medium may be in the form of granules, pellets, floc or the like. Large granules provide the advantage of maintaining a high flow rate through the treatment bed by minimizing clogging of the bed that might otherwise arise from the accumulation of fine particulate debris. Alternatively, fine granules provide enhanced filtration of fine debris. The selection of pellet or granule size depends on the desired level of physical straining and treatment.

Figure 9:
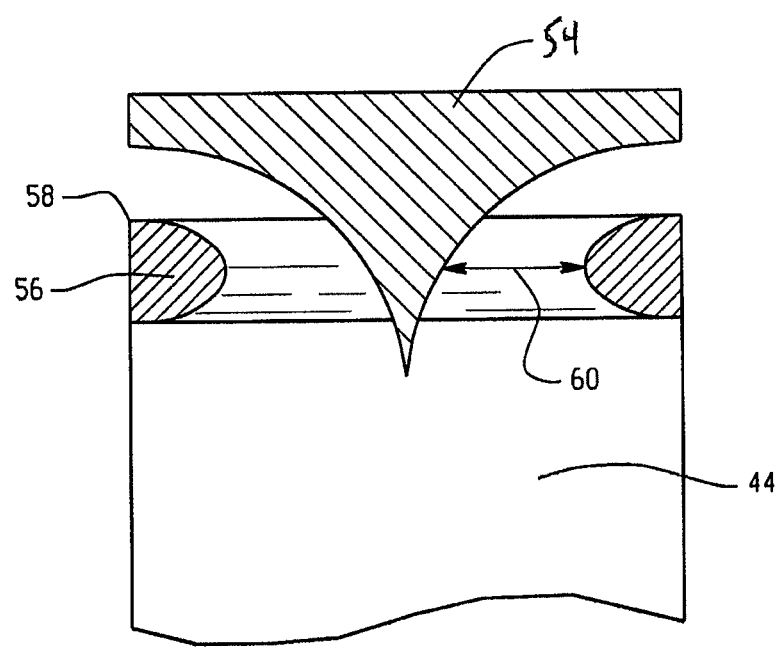
FIG. 9 is a diagrammatic, section view of an embodiment of a siphon enhancing assembly for use with the filter assembly of FIG. 2.

With reference to FIG. 9, filter assembly 12 includes an upper siphon enhancer 54 and a lower siphon enhancer 56 located near the top of the drain tube 44 that may be used to facilitate development of the siphon effect (FIG. 6). Air bubbles can slow the ability of the siphon to begin operation and can cause the siphon effect to break prematurely. The upper and lower siphon enhancers 54 and 56 are shaped and arranged to follow the path of fluid as the fluid travels into the drain tube 44 from the reservoir 48 so as to reduce the formation of air pockets in places that could be detrimental to formation and operation of a siphon.

Stormwater flowing into the drain pipe 44 will form a vortex due to the coriolis force. Upper siphon enhancer 54 is somewhat cone-shaped, shaped and arranged to fill the volume occupied by air as the vortex begins and the center of the vortex drops below the fluid surface level, which can force air in the upper volume of the vortex down through the drain tube 44 and out of the filter assembly 12. Lower siphon enhancer 56 is shaped and arranged to follow the path of fluid over an edge to fill a void that would be created by the stormwater traveling over the edge 58. In some embodiments, a gap 60 formed between the upper and lower siphon enhancers 54 and 56 may be made adjustable by a user to provide flow control of filtered stormwater into the drain tube 44 for example, by adjusting the height of the upper siphon enhancer relative to the lower siphon enhancer using a mechanical, electrical, pneumatic, etc. connector to the upper or lower siphon enhancer.

While the application describes filtering stormwater, the filter assembly may be used to filter other types of fluid such as oil, gas, pulp, paper, etc. While four filter units are described above, more or less filter units may be used, for example, depending on flow requirements and size of the internal volume of the dry well structure. Additionally, the lock mechanism 55 may be used to lock two filter assemblies 12 together, one on top of the other, using cap 24 with a flange 71 (FIG. 2) thus tines 61 and 63 slide under the flange of the cap, for example, for ease of transport. Handles 64 may be used to move the filter assemblies 12.

Figure 10:
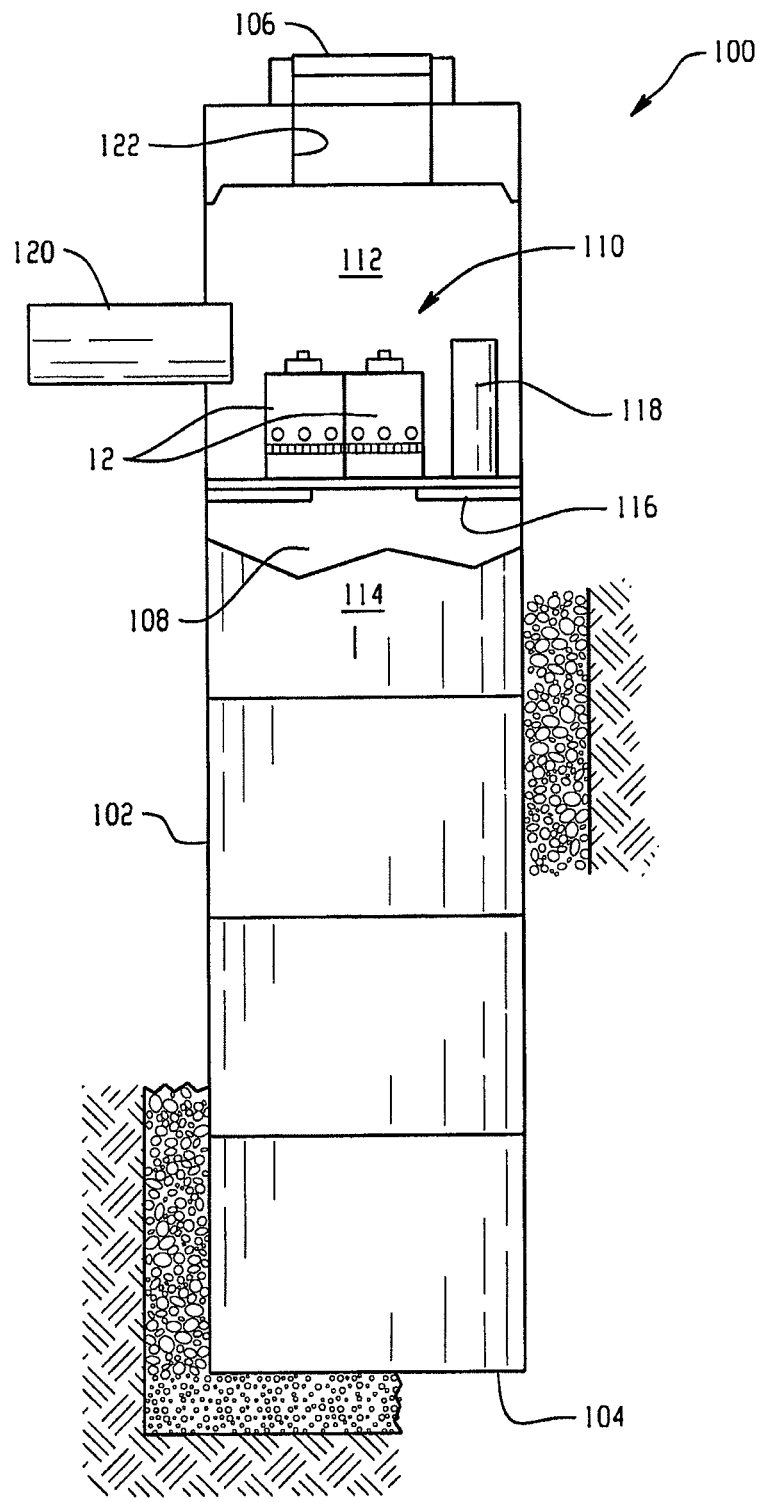
FIG. 10 is a diagrammatic section view of a dry well structure including an embodiment of a filter assembly mounted therein.

Filter assembly 12 may be used in a variety of drainage systems. For example, referring to FIG. 10, a dry well structure 100 includes a wall 102 (e.g., formed of concrete), a base 104 and a top 106 that defines an internal volume 108 of the drywell structure. A stormwater filter and mount assembly 110 is located between region 112 and region 114. Stormwater filter and mount assembly 110 includes multiple filter assemblies 12, a mount assembly 116 that is used to support the filter assemblies 12 at the illustrated location within the internal volume 108, and an overflow conduit 118 (e.g., a 10 inch or 12 inch diameter PVC standpipe) that allows stormwater to bypass the filter assemblies 12 at a predetermined water level. In some embodiments, the stormwater filter and mount assembly 110 is located near a stormwater inlet 120 through which stormwater enters the dry well structure 100. In some embodiments, it may be preferable to locate the stormwater filter and mount assembly 110 just below the inlet 120, yet close to access opening 122 (e.g., about 10 ft. below the access opening) so that a person installing or performing maintenance on the stormwater filter and mount assembly will not have to descend far (e.g., about 15 ft. or more) into the dry well structure 100. Once installed, the filter assemblies 12 filter stormwater entering the dry well structure 100 and then outlets the filtered stormwater into the dry well structure below the stormwater filter and mount assembly 110 and passed into the ground.

Figure 11:
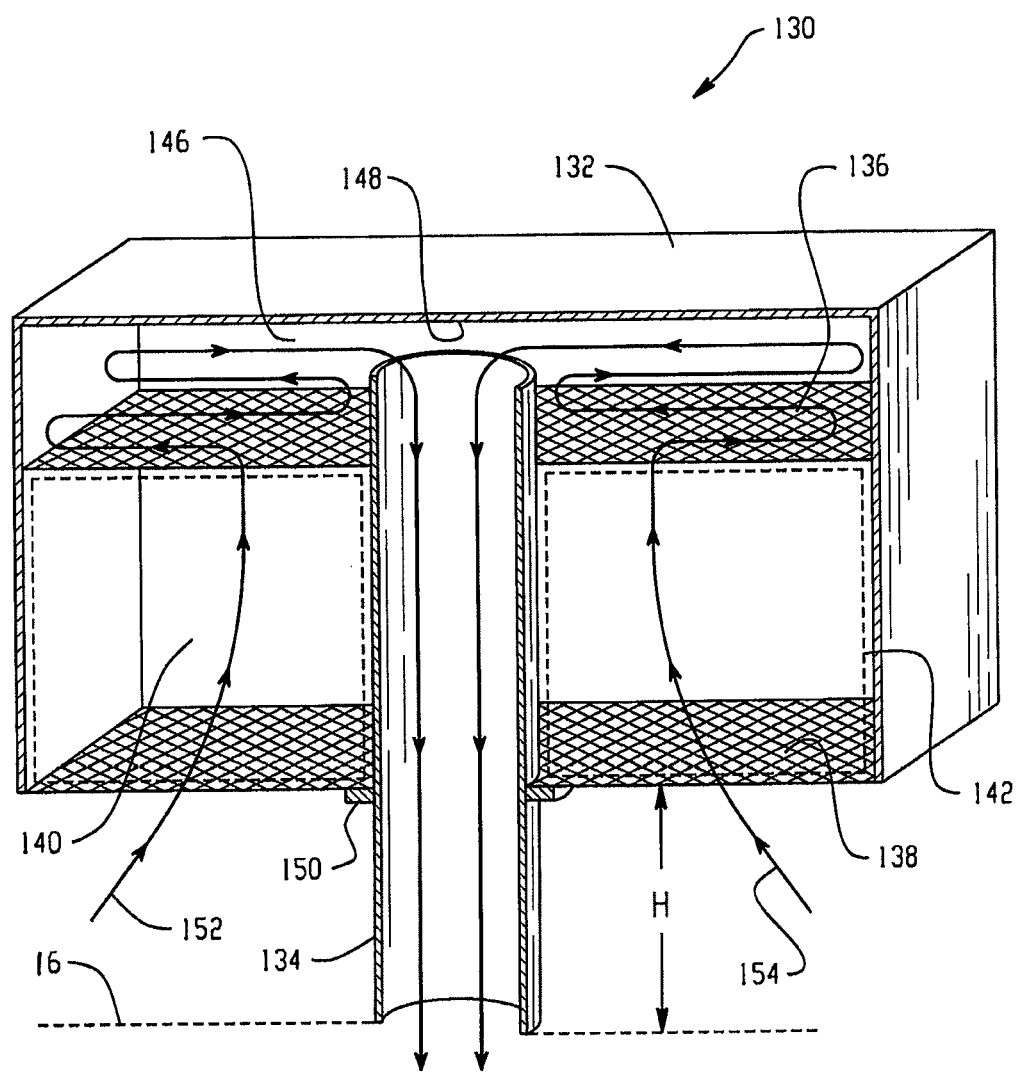
FIG. 11 is a diagrammatic, section view of another embodiment of a filter assembly.

Referring to FIG. 11, another filter assembly embodiment 130 includes a hood 132, a solid, center drain tube 134, an upper media screen 136 and a lower media screen 138. Compartment 140 formed between the upper and lower media screens 136 and 138 includes a filter media (represented by dotted line 142). A filtered stormwater reservoir 146 is formed between the upper media screen 136 and top 148 of the hood 132. The filter assembly 130 is spaced vertically from the ground 16 a distance H by a suitable connector 150 attached to the drain tube 134. Other ways of spacing the filter assembly 130 vertically from the ground are contemplated.

Arrows 152 and 154 represent stormwater flow through the filter assembly 130. During periods of increased flow, the stormwater enters through the lower media screen, travels axially up through the filter media 142 and into the stormwater reservoir 146. The stormwater fills reservoir 146 to a selected level until the filtered stormwater overflows into the drain tube 134, creating a siphon out of the filter assembly 130. As the stormwater level rises in the filter assembly 130, air can escape through the outlet tube 134 or through a vent or air valve, if provided. Some type of flow limiter may be provided to encourage filling of the outlet tube 134 to facilitate the siphon. When the stormwater level outside the filter assembly 130 falls below the hood 132, the siphon breaks, and the filtered stormwater flows from the stormwater reservoir 146 back through the filter media 142 and out of the filter assembly. As above, this backflow can loosen and remove particles from the filter media 142, which can increase its longevity.

Figure 12:
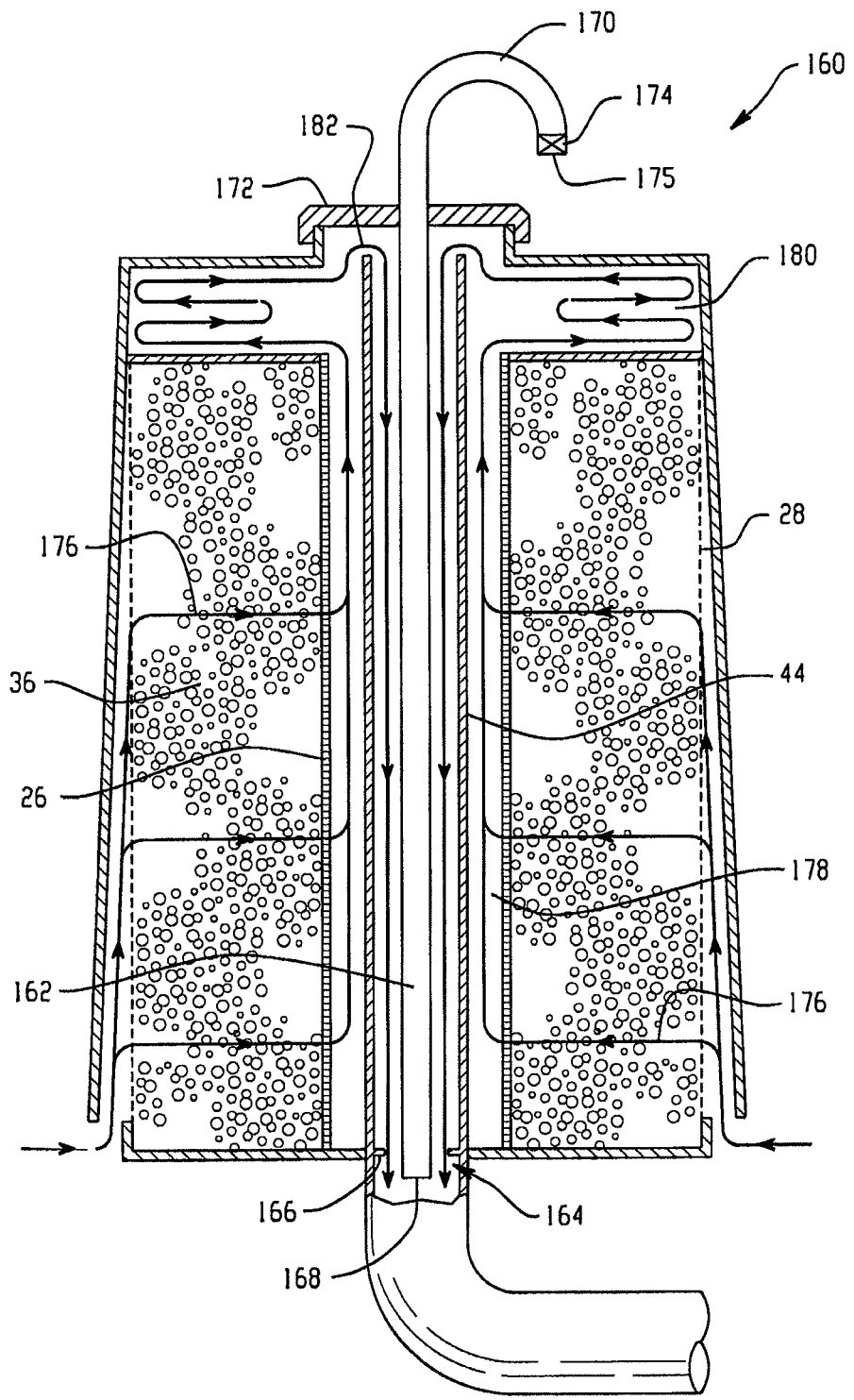
FIG. 12 is a diagrammatic, section view of another embodiment of a filter assembly.

Referring to FIG. 12, another embodiment of a stormwater filter cartridge 160 includes many of the features described above such as outer screen 28, inner perforated tube 26, drain tube 44, filter media 36, etc., but also includes a back flow enhancing tube 162. The back flow enhancing tube 162 is located within the center drain tube 44 and passes through an orifice 164 to an open lower end 168. The orifice 164 is a necked-down portion of the center drain tube 44 that, in the illustrated embodiment, is formed by an annulus 166 extending radially inward from an inner wall of the center drain tube 44. The back flow enhancing tube 162 may also include an opposite, U-shaped end 170 located above a sealed cap 172 and the tube 162 is capable of communicating with the atmosphere. A valve 174 is used to inhibit inflow of water if the water level rises above an inlet end 175 of the back flow enhancing tube 162. The valve 174 may be a float valve that is open when the water level outside the unit is below the valve and that closes when the water level rises to a point where it could enter the upper end of the tube 162.

In operation, stormwater flowing radially through the outer screen 28 and filter media 36, as represented by arrows 176, accumulates within a volume 178 (or back flush path)

between the solid center drain tube 44 and the inner perforated tube 26. The water level rises within the volume 178 until the stormwater accumulates within reservoir 180. As the water level continues to rise, the stormwater within the reservoir 180 enters the center drain tube 44 as represented by arrows 182.

Figure 13:
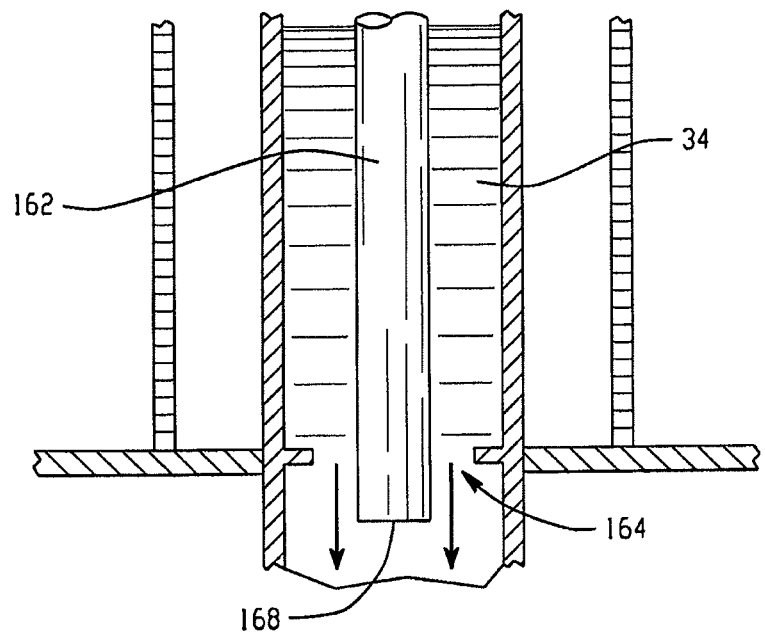
FIG. 13 is a detail view of a center drain tube and orifice of the filter assembly of FIG. 12.
Figure 14:
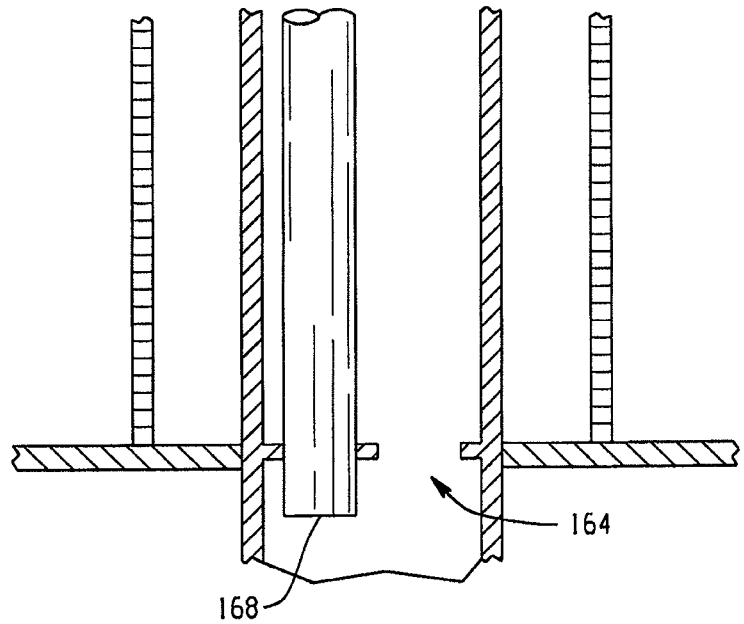
FIG. 14 is an alternative center drain tube embodiment for use in the filter assembly of FIG. 12.

Referring now to FIG. 13, as stormwater flows through the center drain tube 44, it encounters the orifice 164. The stormwater flow then fills the space around the orifice 164 thereby sealing the area around the back flow enhancing tube 162. Sealing the area around the back flow enhancing tube 162 both facilitates formation of a siphon that draws stormwater through the cartridge 160 and maintains the siphon by not allowing air to enter the center drain tube 44 from the back flow enhancing tube 162. Air that may be drawn through the tube 162 by the venturi effect of the siphon flow (when outside water level drops and valve 174 opens) may, in some implementations, be pulled downward and out of the filter by the flowing water. Filtered stormwater continues to flow through the orifice 164 and out of the cartridge 160 while the siphon is maintained. In an alternative embodiment of FIG. 14, offsetting the end 168 from the orifice 164 may cancel or significantly limit the venturi effect, if desired. Additionally, the elevation of the end 168 can be adjusted to adjust the downstream elevation of the siphonic operation.

Figure 15:
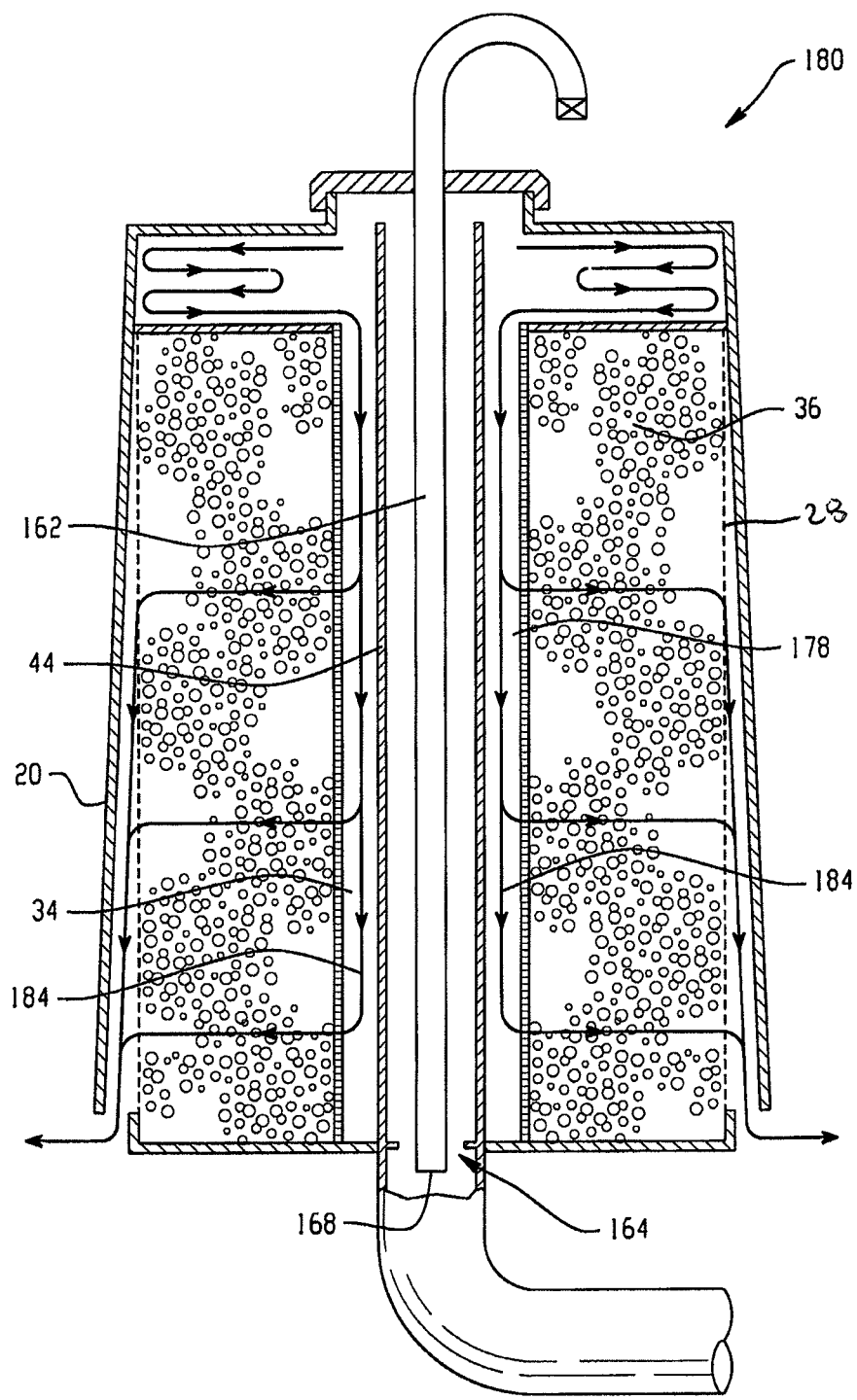
FIG. 15 is a schematic view of stormwater back flow through the filter assembly of FIG. 12.

Referring to FIG. 15, when the water level falls outside the cartridge 160 below a certain level, and air enters under the hood, the siphon will break. This causes the seal at the orifice 164 to be broken as well and air is allowed to enter the center drain tube 44 through end 168 of the back flow enhancing tube 162, thereby breaking the air lock caused by back flushing the stormwater through the cartridges 160, which raises the water level in the vault above the bottom of the hoods. Once the siphon is broken, stormwater remaining in the cartridge back flushes therethrough. Thus, the tube 162 enables a full and complete back flush to take place. In particular, the stormwater travels from the reservoir 180, vertically down the volume 178 as represented by arrows 184, radially outwardly through the filter media 36 and beneath the hood 20. This back flush of filtered stormwater can serve to loosen and remove particles trapped in the filter media 36 thereby increasing longevity of the filter media.

Figure 16:
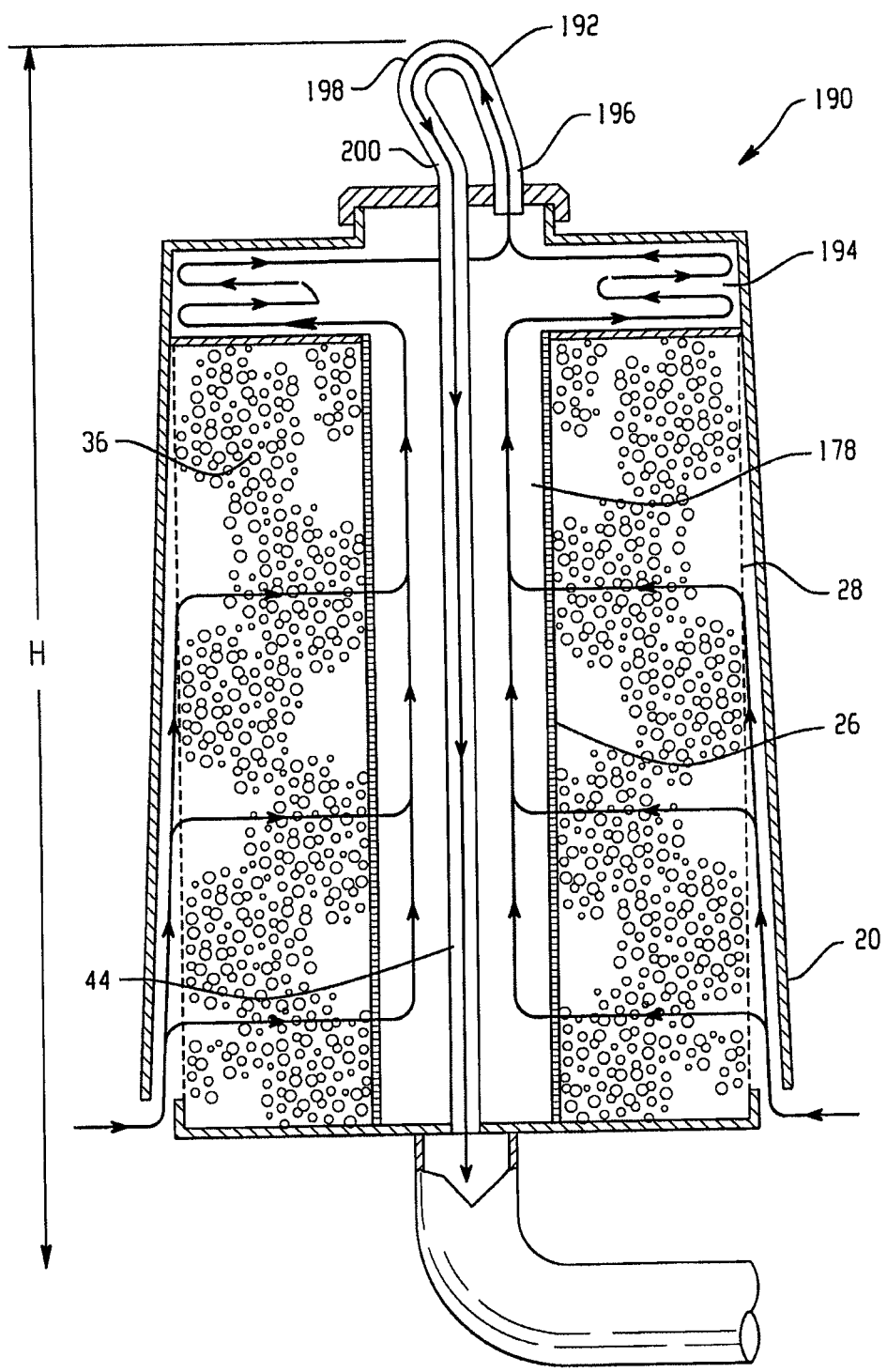
FIG. 16 is a diagrammatic, section view of another embodiment of a filter assembly.

Referring to FIG. 16, another embodiment of a stormwater filter cartridge 190 includes many of the features described above such as outer screen 28, inner perforated tube 26, solid drain tube 44, filter media 36, etc. In this embodiment, a siphon member 192 allows communication between a reservoir 194 and the drain tube 44. The siphon member 192 is somewhat U-shaped where a central axis of the siphon member has an inlet portion 196 that extends upward and in a direction toward a central axis of the drain tube 44, a bend portion 198 and an outlet portion 200 that extends downward and in a direction toward the central axis of the drain tube.

During a storm event, stormwater accumulates in the containment structure 14. As the water surface elevation rises above the filter cartridge 190, the stormwater flows through the filter media 36 and fills a volume 178 (or backwash path) formed between the inner perforated tube 26 and drain tube 44 in a fashion similar to those described above. During this stage, stormwater is driven through the filter media 36 due to the head differential between the treatment chamber and the outlet chamber. As the water level increases above height H, a siphon is initiated through siphon member 192, and stormwater is drawn through the filter cartridge 190. Stormwater continues to be drawn through the filter cartridge 190 until the surface water elevation in the treatment chamber subsides to a point where air is introduced into the filter cartridge from under the hood 20. Once air is introduced, the siphon will break, and water stored in reservoir 180 and siphon member 192 will flow back into the treatment chamber as a back flush.

It is to be clearly understood that the above description is intended by way of illustration and example only and is not intended to be taken by way of limitation, and that changes and modifications are possible. Accordingly, other embodiments are within the scope of the following claims.

What is claimed is:

1. A stormwater filter assembly, comprising:
   a hood structure including an inlet and an outlet;
   a first tube within the hood structure, the first tube aligned with the outlet and having a lower end associated with the outlet;
   a second tube aligned with the outlet and disposed about the first tube defining a flow space therebetween for receiving filtered stormwater;
   a filter media disposed between the inlet and the second tube through which stormwater travels during a filtering operation, the first tube extends upward above a height of the filter media and the second tube extends upward above the height of the filter media;
   a filtered fluid reservoir located above the filter media for collecting filtered stormwater; and
   a water flow path from the inlet to the outlet passes through the filter media before passing downward along the flow space between the first tube and the second tube to reach the outlet.

2. The stormwater filter assembly of claim 1 wherein a lower end of the first tube is open.

3. The stormwater filter assembly of claim 2 wherein during flow of filtered stormwater through the outlet, filtered stormwater seals around the lower end of the first tube.

4. The stormwater filter assembly of claim 3 wherein the first tube extends upward through a top portion of the hood.

5. A stormwater treatment system including a plurality of filter assemblies in accordance with claim 1, the system including:
   a containment structure including an inlet and at least one drain manifold, each filter assembly within the containment structure and having its outlet connected to deliver filtered stormwater to the drain manifold.

6. The system of claim 5 wherein the containment structure is a concrete vault and the drain manifold is embedded in a concrete floor of the vault.

7. The stormwater filter assembly of claim 1, further comprising:
   a one-way air valve to release air from the hood as water level outside the hood rises and as filtered stormwater fills the filtered fluid reservoir;
   wherein the filter media has an open space volume, and the filtered fluid reservoir has a volume that is at least as much as the open space volume;
   wherein as water level outside the hood drops and air enters the hood to break the siphon effect, filtered stormwater from the filtered fluid reservoir back flushes the filter media by traveling back through the filter media.

8. The stormwater filter assembly of claim 1, wherein a top of the first tube is located higher than a top of the second tube.

9. A stormwater filter assembly, comprising:
   a hood structure including an inlet and an outlet;
   a first tube within the hood structure, the first tube aligned with the outlet and having a lower end associated with the outlet, the first tube extending upwardly from the outlet;
   a second tube aligned with the outlet and disposed about the first tube defining a flow space therebetween;

a filter media disposed between the inlet and the second tube;
a filtered fluid reservoir located above the filter media for collecting filtered stormwater; and
a water flow path from the inlet to the outlet passes through the filter media before passing downward along the flow space between the first tube and the second tube to reach the outlet.

* * * * *